United States Patent [19]

Suzuki et al.

[11] E Re. 28,479

[45] Reissued July 8, 1975

[54] COMBINATION TURN-SIGNAL AND HAZARD-WARNING SYSTEM

[75] Inventors: Masaru Suzuki, Aichi; Masayoshi Hyodo, Toyota; Yoshiaki Kurihara, Nagoya, all of Japan

[73] Assignee: Kabushiki Kaisha Tokai Rika Denki Seisakusho, Japan

[22] Filed: May 7, 1974

[21] Appl. No.: 467,779

Related U.S. Patent Documents

Reissue of:

[64] Patent No.: 3,662,336
Issued: May 9, 1972
Appl. No.: 834,269
Filed: June 18, 1969

[52] U.S. Cl. ..... 340/81 F; 200/6 R; 200/61.27; 200/153 R; 340/67

[51] Int. Cl. ..... B60q 1/38

[58] Field of Search ..... 340/81 F, 67; 200/61.27, 200/61.34, 61.35, 6 R, 153 R

[56] References Cited

UNITED STATES PATENTS

| | | | |
|---|---|---|---|
| 1,716,370 | 6/1929 | Dark et al. | 340/73 UX |
| 2,654,079 | 9/1953 | Ringwald | 340/81 F |
| 2,812,396 | 11/1957 | Hollins | 200/61.35 |
| 3,510,839 | 5/1970 | Elliott et al. | 340/81 F |

*Primary Examiner*—Donald J. Yusko
*Attorney, Agent, or Firm*—Woodhams, Blanchard and Flynn

[57] ABSTRACT

A combination turn-signal and hazard-warning system for operating the indicator lamps of a vehicle selectively or simultaneously, wherein fixed contacts for a hazard switch unit are mounted on the bottom side of an insulator plate and fixed contacts for a winker switch unit are mounted on the top side of the plate. A movable contact plate is disposed adjacent the bottom side of the insulator plate and is supported on a contact holder switch is movable between a turn-signal position and a hazard-warning position. When in the hazard-warning position, the movable contact plate causes energization of all indicator lamps irregardless of operation of the directional indicator switch. A further movable conductive member is disposed for engagement with the top-side contacts to permit selective energization of the lamps on one side of the vehicle.

11 Claims, 10 Drawing Figures

INVENTORS
MASARU SUZUKI
MASAYOSHI HYODO
YOSHIAKI KURIHARA

BY Woodhams, Blanchard & Flynn
ATTORNEYS

INVENTORS
MASARU SUZUKI
MASAYOSHI HYODO
YOSHIAKI KURIHARA

BY Woodhams, Blanchard & Flynn
ATTORNEYS

INVENTORS
MASARU SUZUKI
MASAYOSHI HYODO
YOSHIAKI KURIHARA

BY Woodhams, Blanchard & Flynn
ATTORNEYS

INVENTORS
MASARU SUZUKI
MASAYOSHI HYODO
YOSHIAKI KURIHARA

BY Woodhams, Blanchard & Flynn
ATTORNEYS

INVENTORS
MASARU SUZUKI
MASAYOSHI HYODO
YOSHIAKI KURIHARA

BY Woodhams, Blanchard & Flynn
ATTORNEYS

COMBINATION TURN-SIGNAL AND HAZARD-WARNING SYSTEM

Matter enclosed in heavy brackets [ ] appears in the original patent but forms no part of this reissue specification; matter printed in italics indicates the additions made by reissue.

---

The present invention relates to a system for operating direction indicators of an automobile, more particularly a switch for operating direction indicators capable of operating both a winker switch unit and a hazard switch unit simultaneously. In the switch for operating the direction or turn-signal indicators or winkers, a group of fixed contacts is connected to the potential source through the winker flasher unit, and a group of fixed contacts is connected to the left and right winker lamps. The switch further comprises respective groups of fixed contacts mounted on both surfaces of an insulator plate, and a contact holder for a hazard switch unit is provided under said insulator plate, said contact holder being movable reciprocably by operation of a knob to two positions. A movable contact plate is mounted on said contact holder, said movable contact plate being connectable simultaneously to the group of fixed contacts mounted on the top surface of the insulator plate and connectable to said left hand and right hand winker lamps and another group of fixed contacts mounted on the reverse surface thereof and connectable to the potential source through the hazard flasher unit.

In the accompanying drawings.

Description will be made with reference to the accompanying drawings. Similar elements or members common to both embodiments are shown with same reference numerals throughout the drawings.

Figure 1:
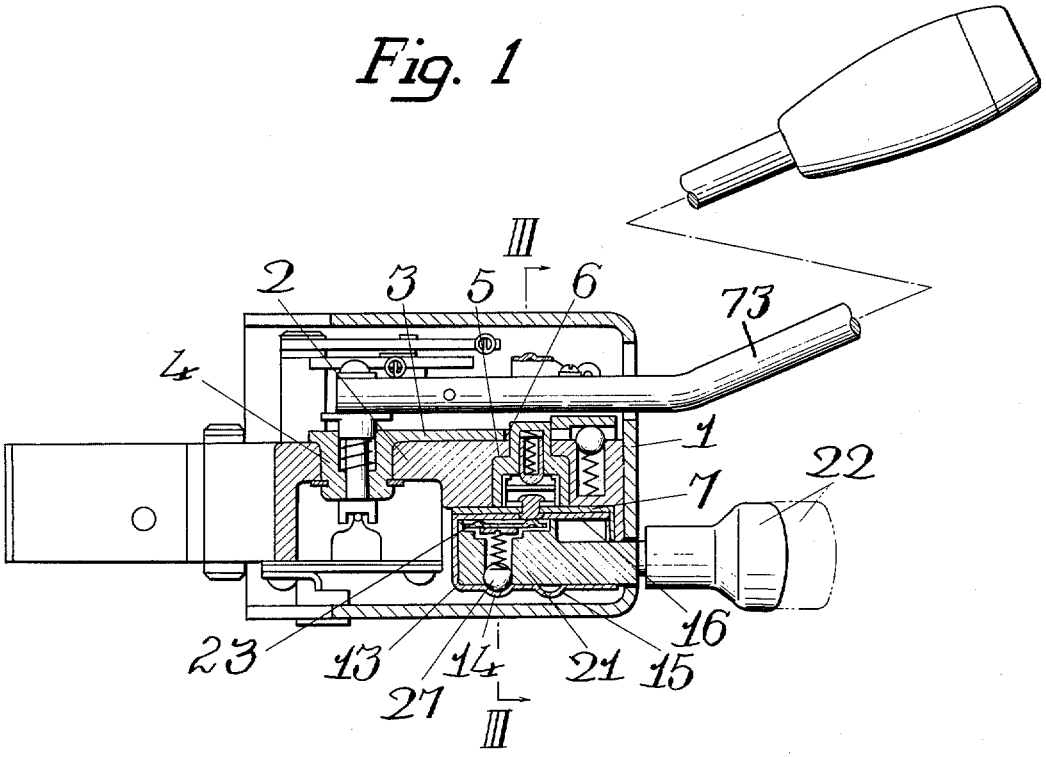
FIG. 1 is a longitudinal sectional side view of a preferred embodiment of a switch for operating direction indicators of the present invention.
Figure 2:
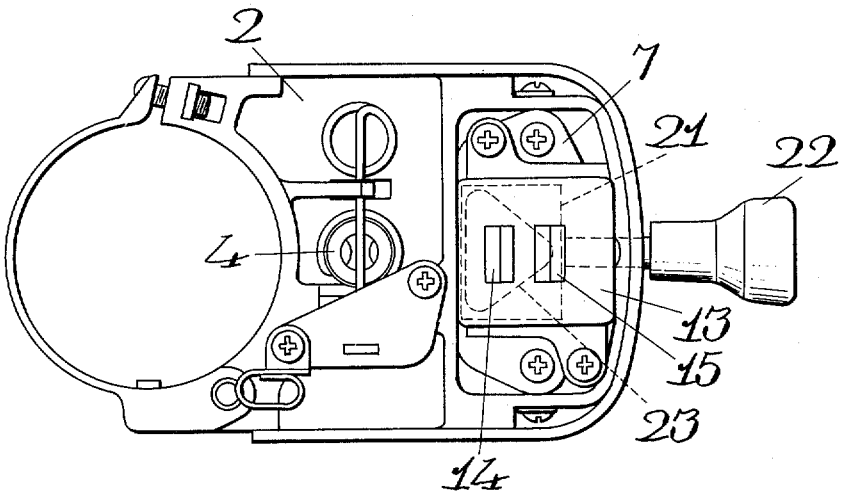
FIG. 2 is a bottom view of the same.
Figure 3:
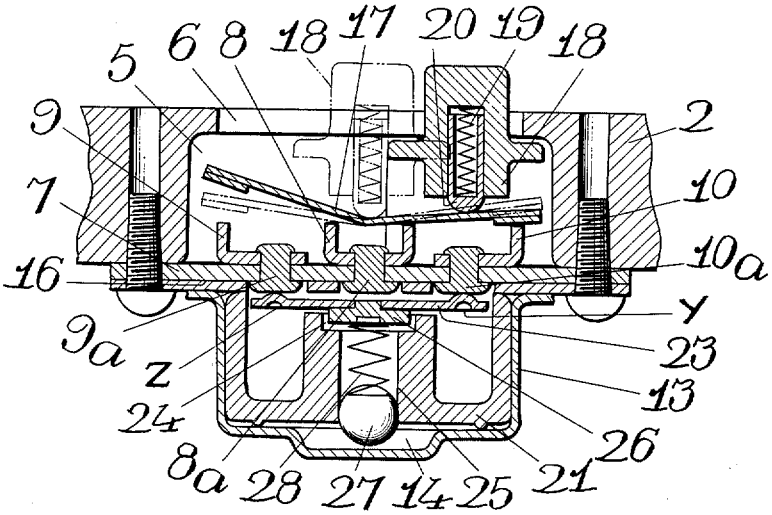
FIG. 3 is a longitudinal sectional front view taken along the line III—III of FIG. 1.

In FIGS. 1 through 5, numeral 1 is a casing which is secured around a steering shaft of an automobile and has an intermediate base plate 2 on which a bracket 3 is supported by a tubular axle 4 inserted rotatably therethrough. Numeral 5 is an upper hollow chamber provided in the base member 2, apart from the tubular axle 4 inserted therethrough, and accommodating a switch unit for winkers or direction indicators. Said upper hollow chamber 5 is provided with an upper slot 6 extending transversely as best shown in FIG. 3 and terminates at an insulator plate 7 covering over the under end thereof and having plural fixed contacts extending therethrough. A fixed contact 8 (FIG. 3) with a U-shape in cross section is mounted on the top surface of plate 7 by a rivet 8a serving as a fixed contact, in a manner extending its free end within said chamber 5, and fixed contacts 9 and 10 each having a L-shape in cross section are secured symmetrically on the right and left sides of the centrally positioned fixed contact 8 and in the same manner as in the above described contact, by rivets 9a and 10a, respectively, each serving as a fixed contact.

Said fixed contacts 8a through 12a on the reverse surface of insulator plate 7 are covered with a guide casing 13 secured to said insulator plate on its reverse surface and having a bottom portion with depressions 14 and 15 provided at a spacing corresponding to that between the fixed contacts 8a and 11a and that between the fixed contacts 9a and 12a, as shown in FIGS. 1 and 2. Numeral 16 is a sub-insulator secured on the reverse side of the insulator plate 7 so as to be coplanar with contact surfaces of fixed contacts 8c through 12a. A movable contact 17 with a slightly bent shape in cross section on said fixed contact 8 at its bent central portion and extends both free ends above left-hand fixed contact 9 and right-hand fixed contact 10, respectively. Numeral 18 is an actuating member disposed within chamber 5 and having an upper portion extending through the slot 6 and a pusher 20 insertedly fitted to an under blind hole and operable by a spring 19 accommodated therein. Said actuating member 18 is positioned so that pusher 20 engages the central bent portion or apex of movable contact 17, when the bracket 3 is in the neutral position, and when said bracket 3 is moved leftwards or rightwards, the actuating member 18 is also moved to either direction in correspondence with the motion of the bracket, as shown in FIG. 3, thereby causing a seesaw motion of the movable V-shaped contact plate 17. The seesaw motion of movable contact plate 17 makes an electric connection of the fixed contact 8 with either of fixed contacts 9 and 10. In this situation, the fixed contact 12a is connected to the potential source B (FIG. 5) through a flasher unit a for directional indicators (As an alternative, the fixed contact 8 may be connected to the potential source B through the flasher unit a.). Fixed contacts 9 and 10 are connected to a left-hand winker lamp WL and a right-hand winker lamp WR, respectively. The fixed contact 11a is connected to the potential source B through a flasher unit b for a hazard warning. The connection of respective contacts is shown in FIG. 5.

Fitted within the guide casing 13 is a contact holder 21, which has a knob 22 extending outwardly of the guide casing and is slidable forwardly or rearwardly by said knob. The contact holder 21 is provided at its upper central part with a recess 24 to which a movable contact plate 23 is fitted, and a hole or slot 25 extending vertically from said recess to terminate at the under end where a ball member 27 is fitted and housing a spring 28 fitted between said ball member 27 and an insulating piece 26 placed under the movable contact plate 23. Said movable contact plate 23 includes three conductive contact points x, y, z making a triangular relationship with each other, and brought into contact with some of fixed contacts 8a through 12a, according to the position of contact holder 21. That is to say, when the contact holder 21 is pushed to the utmost forward position thereof (as shown in FIG. 1), the movable contact plate 23 is also moved to bring the contact points x and z into contact with fixed contacts 8a and 12a (as shown in FIG. 4), and when the contact holder 21 is retracted, the movable contact plate 23 is also moved rearwardly (rightwardly in FIG. 1) to contact the contact points x, y and z with fixed contacts 9a, 10a and 11a, respectively.

In this example, when the contact holder 21 is pushed forwardly by the knob 22 to the turn-signal position illustrated by solid lines in FIG. 1, the movable contact plate 23 is conformed to the movement of said holder to bring the contact points x and y into contact with the fixed contact 8a and 12a, respectively, and the ball member 27 is received within the depression 14. In this situation, if the actuating member 18 is moved by control lever 73 from the central position into one of its opposite operative positions, then this causes the movable contact plate 17 to effect a seesaw motion, the fixed contact 8 is connected to either of fixed contacts 9 and 10, thereby energizing and flashing either of left-hand and right-hand winker lamps, as best shown with the solid line in FIG. 4 and in the connection diagram of FIG. 5.

Figure 4:
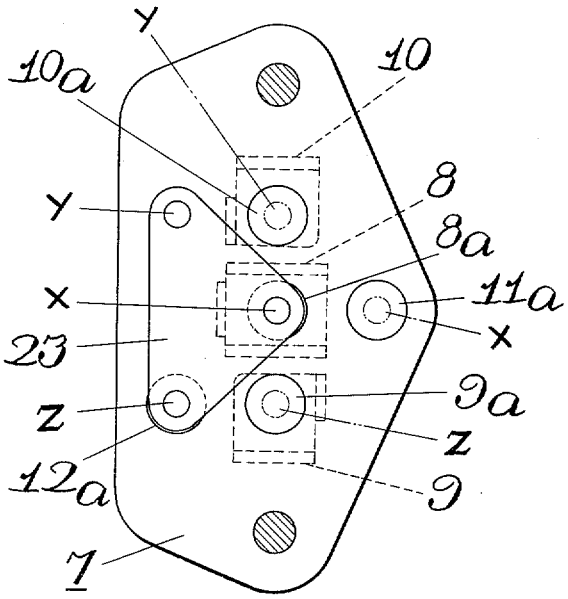
FIG. 4 is a reverse side view of an insulator plate.
Figure 5:
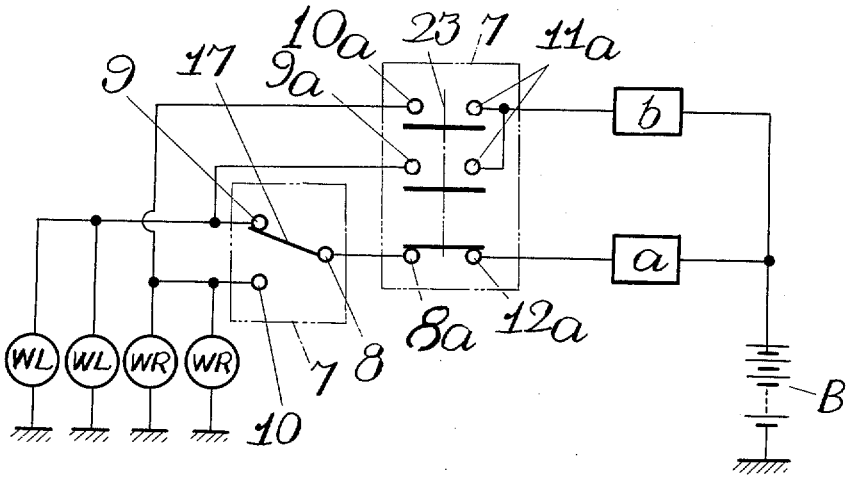
FIG. 5 is a connection diagram corresponding to the position of the switch structure shown in FIG. 4.

Meanwhile, if the contact holder 21 is pulled by knob 22 backwardly (rightwardly in FIG. 1) to the hazard-warning position, the movable contact plate 23, is also moved to the position as shown with the dash-dot line in FIG. 4, so that the contact points x, y, z are brought into contact with the fixed contacts 9a, 10a and 11a, respectively, as illustrated in FIG. 5. By such connection of movable contacts with the fixed contacts, current flows from the potential source B to left-side and right-side winker lamps WL and WR, through the warning switch unit b having a larger capacity, the fixed contact 11a, the movable contact plate 23, the fixed contacts 9a, 10a, and other fixed contacts 9, 10, thereby energizing and flashing both winker lamps. In this case, the position of the movable contact plate 17 and actuating member 18 is immaterial.

In FIGS. 6 through 10 is shown another embodiment, wherein the casing 1 accommodating a switch unit has substantially the same construction as in the former example. That is, it includes the intermediate base member 2 on which the bracket 3 is mounted by the tubular shaft 4 insertedly fitted rotatably thereto, and the hollow chamber 5 provided with the upper slot 6 and having the under end covered by the insulator plate 7 placed thereunder.

The insulator plate 7 has a number of conductive rivets driven therethrough and arranged in rows in the longitudinal axial direction of the device.

Figure 7:
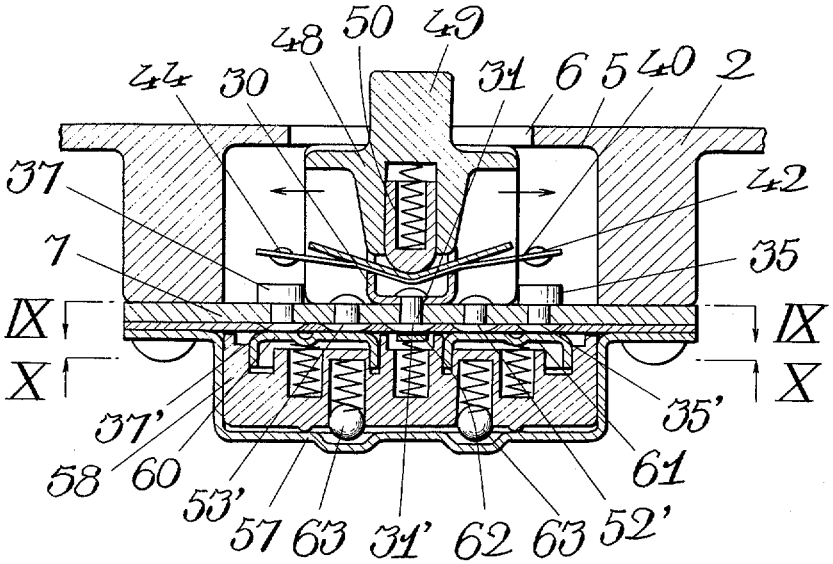
FIG. 7 is a longitudinal sectional front view taken along the line VII—VII of FIG. 6, shown in enlargement.
Figure 8:
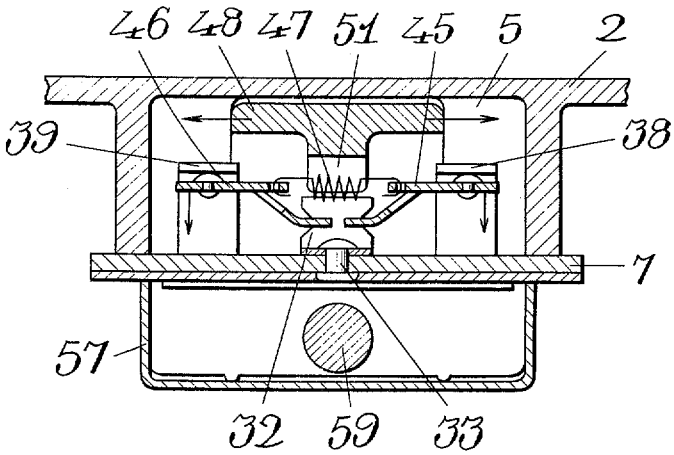
FIG. 8 is a longitudinal sectional front view taken along the line VIII—VIII of FIG. 6, shown in enlargement.
Figure 9:
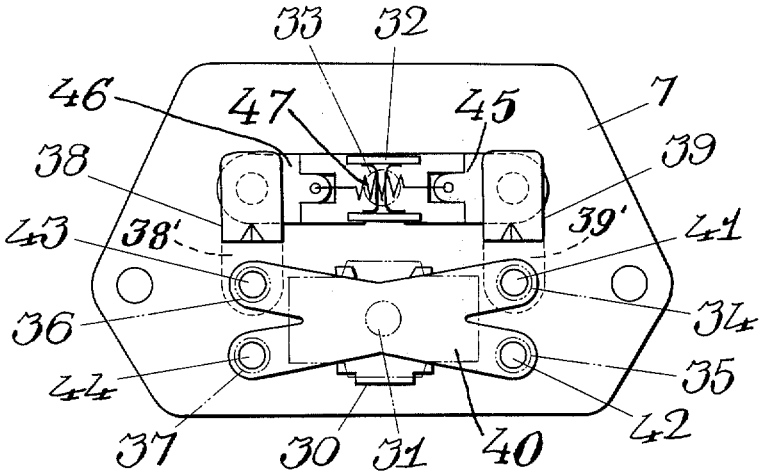
FIG. 9 is an explanatory plan view taken along the line IX—IX of FIG. 7, shown in enlargement.

The hollow chamber 5 accommodates channel-shaped contact support plates 30 and 32 fixed centrally on the top surface of insulator plate 7 by rivets 31 and 33, respectively, and arranged thereon in a longitudinal row with their free ends extending upwardly. On both sides of said contact support plate 30, rivet type fixed contacts 34, 35 and 36, 37 are arranged respectively in rows in the longitudinal axial direction, and on both sides of the contact support member 32 are plates 38 and 39 connected electrically by strips 38' and 39' to the fixed contacts 34 and 36, respectively, and each having an under contact portion. The contact support member 30 carries on its upper free ends a movable contact plate 40 having a slightly bent shape in cross section and forked ends (FIG. 9) with movable contacts 41, 42 and 43, 44 extending above said fixed contacts 34, 35 and 36, 37, as best shown in FIGS. 7 and 9. The other contact support member 32 supports swingeable plates 45 and said swingeable plates 45 and 46 being pulled against each other by a spring 47 provided at their opposing ends and maintained in contact with the plates 38 and 39 at their other ends, as shown in FIGS. 8 and 9. The actuating member 48 fitted reciprocably within the hollow chamber 5 is substantially the same in its structure as that of the former example (member 18 in FIGS. 1–5), with the exception that two parallel projections 51 extend downwardly therefrom above the contact support member 32 to straddle the spring 47. That is, said actuating member 48 includes the upper part 49 extending through the slot 6 to engage the bracket 3 (whereby actuating member 48 is movable longitudinally of chamber 5 in the elongated direction of slot 6), and the pusher 50 accommodated in the under blind hole and operable downwardly by the spring housed in said hole, and said projections 51 extending downwardly in parallel. The pusher 50 of actuating member 48 is pushed downwardly by the spring into contact with the central portion of movable contact plate 40, thereby controlling a seesaw motion of said V-shaped plate 40. Projections 51 cause contact 45 or 46 to disengage contact 38 or 38 since the projections 51 act to press either of swingeable plates 45 and 46 to cause it to effect a downward swingeable motion, against force of the spring 47, when actuating member 48 is moved rightwardly or leftwardly from its central position in the directions of the arrows shown in FIG. 8.

Figure 10:
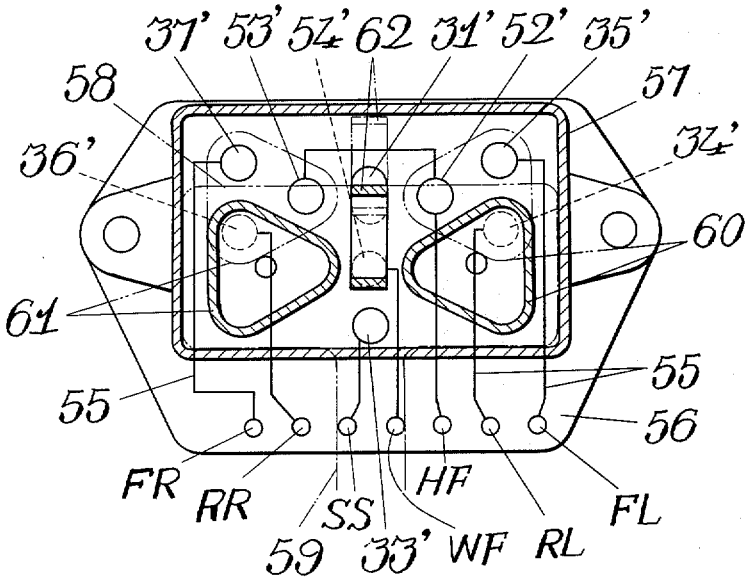
FIG. 10 is an explanatory bottom view taken along the line X—X of FIG. 7, shown in enlargement.

As described in the foregoing passages, said fixed contacts 31, 34 through 37 are rivets which extend through the insulator plate 7 to project uniformly on the reverse side thereof and are used as fixed contacts 31', 34', 35' and 36', 37' for a hazard switch unit. The insulator plate 7 has, on its reverse side, fixed contacts 52' and 53' each arranged at a triangular position in relation to each of said pair of fixed contacts 34', 35' and 36', 37'; a further fixed contact 54' mounted in alignment with the fixed contact 31' in the longitudinal axial direction of the device; and a print wiring 55 on which terminals of below-mentioned elements are in a row in the transverse direction of the device, as shown in FIG. 10. Connection of the fixed contacts with terminals is as follows: the fixed contact 33' is connected to a battery and is also connected to a terminal of the stop lamp switch SS; the fixed contact 54' is connected to a terminal of a winker flasher unit WF; the fixed contact 52' is connected to a terminal of hazard flasher unit HF; the fixed contacts 35' and 34' are connected to those of a front left-hand winker lamp FL and a rear left-hand winker lamp RL, respectively; and the fixed contact 37' and 36' are connected to those of a front right-hand winker lamp FR and a rear right-hand winker lamp RR, respectively; the fixed contacts 52' and 53' being connected electrically to each other.

Numeral 57 is a casing with a square cross section secured to the reverse side of insulator plate 7 so as to cover all of the fixed contacts of a hazard switch unit and the fixed contact 33'. Said casing 57 accomodates a contact holder 58 insertedly fitted slidably in the longitudinal axial direction of the device by operation of a knob 59 extending outwardly of the casing 1. Said contact holder 58 with the knob 59 is discriminated from that of the first embodiment in its structure, but similar in its function. On said contact holder 58 there are mounted triangular movable contact plates 60, 61, which are brought into contact with the fixed contacts 34' and 36', separately, at one position of the contact holder 58, and brought into contact with the fixed contacts 35', 34', 52', and 37', 36', 53', independently, at the other position of said contact holder; an I-shaped movable contact plate 62 as mounted on holder 58 contacts the fixed contacts 31' and 54' at said one position of contact holder 58, while plate 62 contacts the single fixed contact 31' at said other position thereof. All of movable contact plates 60, 61 and 62 are urged by springs toward the plate 7. Holder 58 has spring-urged ball bearings 63 engageable with recesses of the casing for releasably holding the holder 58 in either position.

Figure 6:
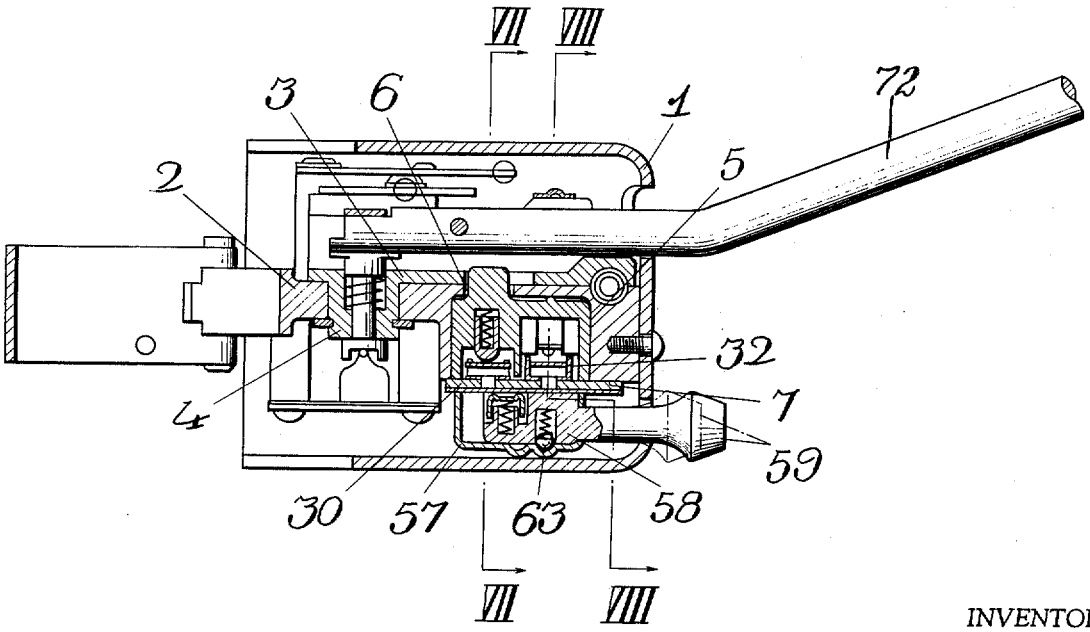
FIG. 6 is a longitudinal sectional side view showing another embodiment of a switch for operating direction indicators of the present invention.

Operation is as follows:

In the case that the contact holder 58 is pulled rearwardly by the knob 59 (rightwardly in FIG. 6) to locate at the position as shown with the solid line in FIGS. 6 and 10, which position may be referred to as the turn-signal position, the movable contact plates 60 and 61 are brought into contact with the fixed contacts 34' and 36', respectively, and the movable contact plate 62 comes to contact with the fixed contacts 31' and 54' to bridge therebetween, so that the contact support member 30 and movable contact plate 40 rested thereon are connected to the potential source through the winker flasher unit terminal WF. In this situation, if the actuating member 48 is moved leftwardly or rightwardly, as by control lever 72, into one of its operative positions to cause a swingeable motion of movable contact plate 40, energigation of winkers or directional indicators are controlled.

Also, when the contact holder 58 is in the turn-signal position as described above, the rear lamps RL and RR can also be energized through the use of the stop switch SS. Particularly, when the switch SS is closed, this results in energization of contact 33', which energizes the support plate 32 and in turn energizes the contacts 45 and 46. The contacts 45 and 46 in turn energize contacts 38 and 39, which contacts in turn are electrically interconnected to the contacts 34' and 36'. Since these latter contacts are connected to the rear lamps RL and RR, they are thus energized due to closure of the switch SS.

In the case that the contact holder 58 is pushed forwardly by the knob 59 to locate it at the position as shown with the dotted line in FIG. 6, which position may be referred to as the hazard-warning position, the triangular movable contact 60 is also moved to contacct its contact points with the fixed contacts 35', 34', 52', the other triangular movable contact 61 is brought into contact with the fixed contacts 37', 36', 53', and the movable contact 62 is detached from the fixed contact 54', and is consequently maintained in an non-operative position as a dummy contact, which is illustrated with the dotted line in FIG. 10. Thus, the fixed contacts 52' and 53' are connected to the potential source through the hazard flasher unit HF, whereby all lamps of four direction indicators are simultaneously energized to send emergency signals or flashes.

As set forth hereinabove, the switch for operating direction indicators incorporated with a hazard switch unit in this embodiment is so constructed that a group of fixed contacts 34, 35 and 36, 37 for a winker or turn-signal switch unit are mounted in rows in the longitudinal axial direction of the device on the top side of insulator plate 7, said fixed contacts 34, 35 and 36, 37 being connected to all lamps of left-hand and right-hand direction indicators in front and in the rear part of an automobile, said fixed contacts 34 through 37 having other ends driven through the insulator plate 7 to extend on the reverse side thereof and serving as fixed contacts for a hazard switch unit 34', 35' and 36', 37'; fixed contacts 52' and 53' are mounted to take a triangular position relative to said fixed contacts 34', 35' and 36', 37', respectively, said fixed contacts 52', 53' being connected to the potential source through the hazard flasher unit HF; and the contact holder 58 on which movable contact plates 60, 61 are mounted is fitted under the insulator plate 7 reciprocably slidably in the longitudinal axial direction in which fixed contacts 34', 35' and 36', 37' are mounted in rows, said movable contacts 60 and 61 being capable of contacting the fixed contacts 34', 35', 52' and 36', 37', 53' at its one position, all of fixed contacts for the hazard switch and flasher switch connecting to direction indicators consisting of rivets driven through the insulator plate to extend their both ends on the top or reverse sides thereof. The switch for operating directioned indicators having such construction has many advantages that attachment of fixed contacts is extremely easily performed by driving rivets through the insulator plate, an electrical connection of contacts for winker switch and hazard switch to respective lamps of direction indicators is common, and a switch mechanism of a winker unit and hazard unit in combination is extremely simplified, resulting in an easy mounting of such switch unit on the direction indicators.

In both of the embodiments of the present invention, the movable contact member 17 or 40 used for controlling the vehicle indicator lamps when the contact holder 21 or 58 is in the turn-signal position is movable within a plane which is substantially transverse to the direction of movement of the contact holder 21 or 58 when the latter is moved between the turn-signal and hazard-warning position. Further, when the contact holder 21 or 58 is in the hazard-warning position, this causes both the right and left indicator lamps to be simultaneously flashed, even though the movable contact member 17 or 40 is moved from its central position into one of the opposite operating positions. The flashing of the right and left indicator lamps when the contact holder 21 or 58 is in hazard-warning position can be discontinued only by manually moving the contact member 21 or 58 back to its turn-signal position.

What is claimed is:

1. A combined turn-signal and hazard-warning signal system for a vehicle having right and left indicator lights, comprising:

stationary housing means;

actuating means movably mounted on said housing means, said actuating means including a movable actuating member normally maintained in a neutral position and being movable into first and second actuating positions disposed on substantially opposite sides of said neutral position;

holder means mounted on said housing means for movement in a first direction between a turn-signal position and a hazard-warning position;

first movable contact means mounted on said holder means for movement therewith in said first direction;

second movable contact means movably mounted on said housing means for movement in a plane substantially transverse to said first direction, said second movable contact means being disposed for actuation and movement into first and second operative positions by said actuating member when same is moved into said first and second actuating positions, respectively;

stationary contact means mounted on said housing means and disposed for coaction with said first and second movable contact means for controlling energization of the right and left indicator lights;

first circuitry means for permitting flashing of a selected one of said right and left indicator lights, said first circuitry means causing flashing of only said left indicator lights when said second movable contact means is in said second operative position and said holder means is in said turn-signal position, said first circuitry means including cooperating contacts on said second movable contact means and said stationary contact means and further cooperating contacts on said stationary contact means and said first movable contact means;

second circuitry means connected to both said right and left indicator lights for permitting flashing of both said right and left indicator lights when said holder means is in said hazard-warning position, said second circuitry means including cooperating contacts coacting between said first movable contact means and said stationary contact means for causing energization and flashing of both said right and left indicator lights;

said stationary contact means including an insulator plate fixedly secured to said housing means and positioned between said first and second movable contact means, said stationary contact means including a first plurality of sationary contacts disposed adjacent one side of said insulator plate and a second plurality of stationary contacts disposed adjacent the other side of said insulator plate, at least some of said first plurality of stationary contacts being conductively interconnected to at least some of the contacts of said second plurality of stationary contacts, and said first and second plurality of stationary contacts being disposed for engagement with said first and second movable contact means, respectively;

said second plurality of stationary contacts including first, second and third stationary contacts disposed for coaction with said second movable contact means, said second movable contact means including a conductive element having a first portion thereof disposed in continuous engagement with said first stationary contact and having second and third movable portions positioned for alternate engagement with said second and third stationary contacts, respectively, said second and third stationary contacts being connected to the right and left indicator lights respectively;

said first plurality of stationary contacts including fourth, fifth and sixth stationary contacts conductively connected to said first, second and third stationary contacts, respectively; and said first movable contact means including a first movable contact disposed for engagement with said fourth stationary contact only when said holder means is in said turn-signal position, and said first movable contact means including second and third movable contacts disposed for engagement with the fifth and sixth stationary contacts only when said holder means is in said hazard-warning position.

2. A system according to claim 1, wherein said first movable contact means includes a conductive element having said first, second and third movable contacts disposed thereon in a triangular arrangement, and said fourth, fifth and sixth stationary contacts being disposed in a straight row substantially parallel to one side of the triangular arrangement, and said first plurality of stationary contacts including seventh and eighth stationary contacts adapted to be connected to a potential source and disposed for engagement with said conductive element when the latter is in the turn-signal and hazard-warning positions, respectively.

3. A system according to claim 1, wherein said first movable contact means includes first, second, and third conductive elements, said second and third conductive elements being of triangular shape and being disposed on opposite sides of said first conductive element, and said first movable contact being fixedly secured to said first conductive element; said first plurality of stationary contacts further including seventh and eighth stationary contacts connected to a potential source and positioned respectively for engagement with said second and third conductive elements only when said holder means is in said hazard-warning position, said second conductive element causing a bridging between said seventh and said fifth stationary contacts and said third conductive means causing a bridging between said eighth and said sixth stationary contacts; and said first plurality of stationary contacts further including a ninth stationary contact connected to a potential source and disposed for engagement with said first conductive element only when said holder means is in the turn-signal position, whereby said first conductive element causes a bridging between said fourth and said ninth stationary contacts.

4. A system according to claim 1, wherein said conductive element is mounted for pivotal movement within a plane substantially transverse to said first direction, said conductive element being pivotally engaged substantially at its midpoint with said first stationary contact, and said conductive element having the opposite free ends thereof normally spaced from and disposed out of engagement with said second and third stationary contacts, whereby movement of said actuating member to said first or second actuating positions causes one of the free ends of said conductive element to be moved into conductive engagement with one of said second and third stationary contacts.

5. A combined turn-signal and hazard warning signal system for a vehicle having right and left indicator lights, comprising:

stationary housing means;

actuating means movably mounted on said housing means, said actuating means including a movable actuating member normally maintained in a neutral position and being movable into first and second actuating positions disposed on substantially opposite sides of said neutral position;

holder means mounted on said housing means for movement in a first direction between a turn-signal position and a hazard-warning position;

first movable contact means mounted on said holder means for movement therewith in said first direction;

second movable contact means movably mounted on said housing means for movement in a plane substantially transverse to said first direction, said second movable contact means being disposed for actuation and movement into first and second operative positions by said actuating member when same is moved into said first and second actuating positions respectively, and said actuating member being movable in a second direction which is substantially parallel to said plane;

stationary contact means mounted on said housing means and disposed for coaction with said first and second movable contact means for controlling energization of the right and left indicator lights;

first circuitry means for permitting flashing of a selected one of said right and left indicator lights, said first circuitry means causing flashing of only said right indicator lights when said second movable contact means is in said first operative position and said holder means is in said turn-signal position, said first circuitry means also causing energization and flashing of only said left indicator lights when said second movable contact means is in said second operative position and said holder means is in said turn-signal position, said first circuitry means including cooperating contacts on said second movable contact means and said stationary contact means and further cooperating contacts on said stationary contact means and said first movable contact means;

second circuitry means connected to both said right and left indicator lights for permitting flashing of both said right and left indicator lights when said holder means is in said hazard-warning position irrespective of the position of said second movable contact means and said actuating means, said second circuitry means including cooperating contacts coacting between said first movable contact means and said stationary contact means for causing energization and flashing of both said right and left indicator lights; and said second movable contact means including first and second elongated conductive elements mounted for pivotal movement within said plane, each of said conductive elements having a contact adjacent the free end thereof disposed for engagement with said stationary contact means, the contacts on said first and second conductive elements being disposed for closing said first circuitry means when said actuating member is moved to said first and second actuating positions, respectively.

6. A system according to claim 5, wherein the first and second elongated conductive elements of said second movable contact means are fixedly connected and comprise an elongated conductive member mounted for pivotal movement substantially about the mid-point thereof, said conductive member having first and second contacts disposed adjacent the opposite free ends thereof and positioned for engagement with corresponding contacts on said stationary contact means for causing energization and flashing of said right and left indicator lights, respectively, when the actuator member is moved into said first and second actuating positions, respectively.

7. A combined turn-signal and hazard-warning signal system for a vehicle having right and left indicator lights, comprising:

stationary housing means;

actuating means movably mounted on said housing means, said actuating means including a movable actuating member normally maintained in a neutral position and being movable into first and second actuating positions disposed on substantially opposite sides of said neutral position;

holder means mounted on said housing means for movement in a first direction between a turn-signal position and a hazard-warning position;

first movable contact means mounted on said holder means for movement therewith in said first direction;

second movable contact means movably mounted on said housing means for movement in a plane substantially perpendicular to said first direction, said second movable contact means being disposed for actuation and movement into first and second operative positions by said actuating member when same is moved into said first and second actuating positions, respectively;

stationary contact means mounted on said housing means and disposed for coaction with said first and second movable contact means for controlling energization of the right and left indicator lights;

first circuitry means for permitting flashing of a selected one of said right and left indicator lights, said first circuitry means causing flashing of only said right indicator lights when said second movable contact means is in said first operative position and said holder means is in said turn-signal position, said first circuitry means also causing energization and flashing of only said left indicator lights when said second movable contact means is in said second operative position and said holder means is in said turn-signal position, said first circuitry means including a turn-signal flasher unit connected to a potential source and a first contact connected to said turn-signal flasher unit, said first contact being mounted on said stationary contact means and disposed for engagement with a further contact on said first movable contact means when said holder means is in said turn-signal position, whereby movement of said second contact means causes flashing of the right or left indicator lights, said first contact being open when said holder means is in said hazard-warning position; and second circuitry means connected to both said right and left indicator lights for permitting flashing of both said right and left indicator lights when said holder means is in said hazard-warning position, said second circuitry means including a hazard-warning flasher unit connected to said potential source and a second contact connected to said hazard-warning flasher unit, said second contact being mounted on said stationary contact means and disposed for engagement with a further contact on said first movable contact means when said holder means is in said hazard-warning position to thus cause flashing of both left and right indicator lights, said second contact being open when said holder means is in said turn-signal position.

8. A system according to claim 7, wherein said second circuitry means causes energization and flashing of both said right and left indicator lights when said holder means is in said hazard-warning position irrespective of the position of said second movable contact means and said actuating means.

9. A system according to claim 8, wherein said actuating member is movable in a second direction which is substantially parallel to said plane.

10. A system according to claim 7, wherein said stationary contact means includes an insulator plate fixedly secured to said housing means and positioned between said first and second movable contact means, said stationary contact means including a first plurality of stationary contacts disposed adjacent one side of said insulator plate and a second plurality of stationary contacts disposed adjacent the other side of said insulator plate, at least some of said first plurality of stationary contacts being conductively interconnected to at least some of the contacts of said second plurality of stationary contacts, and said first and second plurality of stationary contacts being disposed for engagement with said first and second movable contact means, respectively.

*11. A combined turn-signal and hazard-warning signal system for a vehicle having right and left indicator lights, comprising:*

*stationary housing means;*

*actuating means movably mounted on said housing means, said actuating means including a movable actuating member normally maintained in a neutral position and being movable into first and second actuating positions disposed on substantially opposite sides of said neutral position;*

*holder means mounted on said housing means for movement in a first direction between a turn-signal position and a hazard-warning position;*

*first movable contact means mounted on said holder means for movement therewith in said first direction;*

*second movable contact means movably mounted on said housing means for movement substantially transverse to a plane including the under-mentioned insulator plate of the stationary contact means, said second movable contact means being disposed for actuation and movement into first and second operative positions by said actuating member when same is moved into said first and second actuating positions, respectively;*

*stationary contact means mounted on said housing means and disposed for coaction with said first and second movable contact means for controlling energization of the right and left indicator lights;*

*first circuitry means for permitting flashing of a selected one of said right and left indicator lights, said first circuitry means causing flashing of only said left indicator lights when said second movable contact means is in said second operative position and said holder means is in said turn-signal position, said first circuitry means including cooperating contacts on said second movable contact means and said stationary contact means and further cooperating contacts on said stationary contact means and said first movable contact means;*

*second circuitry means connected to both said right and left indicator lights for permitting flashing of both said right and left indicator lights when said holder means is in said hazard-warning position, said second circuitry means including cooperating contacts coacting between said first movable contact means and said stationary contact means for causing energization and flashing of both said right and left indicator lights;*

*said stationary contact means including an insulator plate fixedly secured to said housing means and positioned between said first and second movable contact means, said stationary contact means including a first plurality of stationary contacts disposed adjacent one side of said insulator plate and a second plurality of stationary contacts disposed adjacent the other side of said insulator plate, at least some of said first plurality of stationary contacts being electrically interconnected to at least some of the contacts of said second plurality of stationary contacts, and said first and second plurality of stationary contacts being disposed for engagement with said first and second movable contact means, respectively;*

*said second plurality of stationary contacts including first, second and third stationary contacts disposed for coaction with said second movable contact means, said second movable contact means including a conductive element having a first portion thereof disposed in continuous engagement with said first stationary contact and having second and third movable portions positioned for alternate engagement with said second and third stationary contacts, respectively, said second and third stationary contacts being connected to the right and left indicator lights respectively;*

*said first plurality of stationary contacts including fourth, fifth and sixth stationary contacts electrically connected to said first, second and third stationary contacts, respectively; and*

*said first movable contact means including a first movable contact disposed for engagement with said fourth satationary contact only when said holder means is in said turn-signal position, and said first movable contact means including second and third movable contacts disposed for engagement with the fifth and sixth stationary contacts only when said holder means is in said hazard-warning position.*

* * * * *